United States Patent [19]

Richardson

[11] 4,266,344

[45] May 12, 1981

[54] DIPSTICK ALIGNMENT GUIDE

[75] Inventor: Mason E. Richardson, Clinton Township, Macomb County, Mich.

[73] Assignee: Estan Manufacturing Company, Troy, Mich.

[21] Appl. No.: 76,760

[22] Filed: Sep. 18, 1979

[51] Int. Cl.³ .................................... G01F 23/06
[52] U.S. Cl. .......................... 33/126.7 R; 116/227
[58] Field of Search ...................... 116/227; 73/298; 33/126.7 R, 126.4 R

[56] References Cited

U.S. PATENT DOCUMENTS

| | | | |
|---|---|---|---|
| 1,776,942 | 9/1930 | Deutsch | 33/126.7 R |
| 2,127,835 | 8/1938 | Tower | 33/126.7 R |
| 2,254,662 | 9/1941 | Naples et al. | 33/126.7 R |
| 2,474,805 | 7/1949 | Coderre | 116/227 X |
| 2,705,372 | 4/1955 | Cornell | 33/126.7 R |
| 2,760,636 | 8/1956 | Johnson | 33/126.7 R X |
| 3,147,554 | 9/1964 | Beattie | 33/126.7 R |
| 3,460,181 | 8/1969 | Denver | 33/126.7 R |
| 3,488,855 | 1/1970 | Howe | 33/126.7 R |
| 3,735,494 | 5/1973 | Gumtow | 33/126.7 R X |
| 3,991,476 | 11/1976 | Haines | 33/126.7 R X |

FOREIGN PATENT DOCUMENTS 137562  10/1952  Sweden ................... 33/126.7 R

Primary Examiner—Daniel M. Yasich
Attorney, Agent, or Firm—Harnes, Dickey & Pierce

[57] ABSTRACT

A dipstick assembly including an alignment guide comprising a fluid level indicating instrument having a rigid arcuate portion and an access passageway having a rigid arcuate portion of the same arcuate contour as the arcuate portion of the fluid level indicating instrument for preventing the rotation of the fluid level indicating instrument when it is received within the access passageway.

13 Claims, 2 Drawing Figures

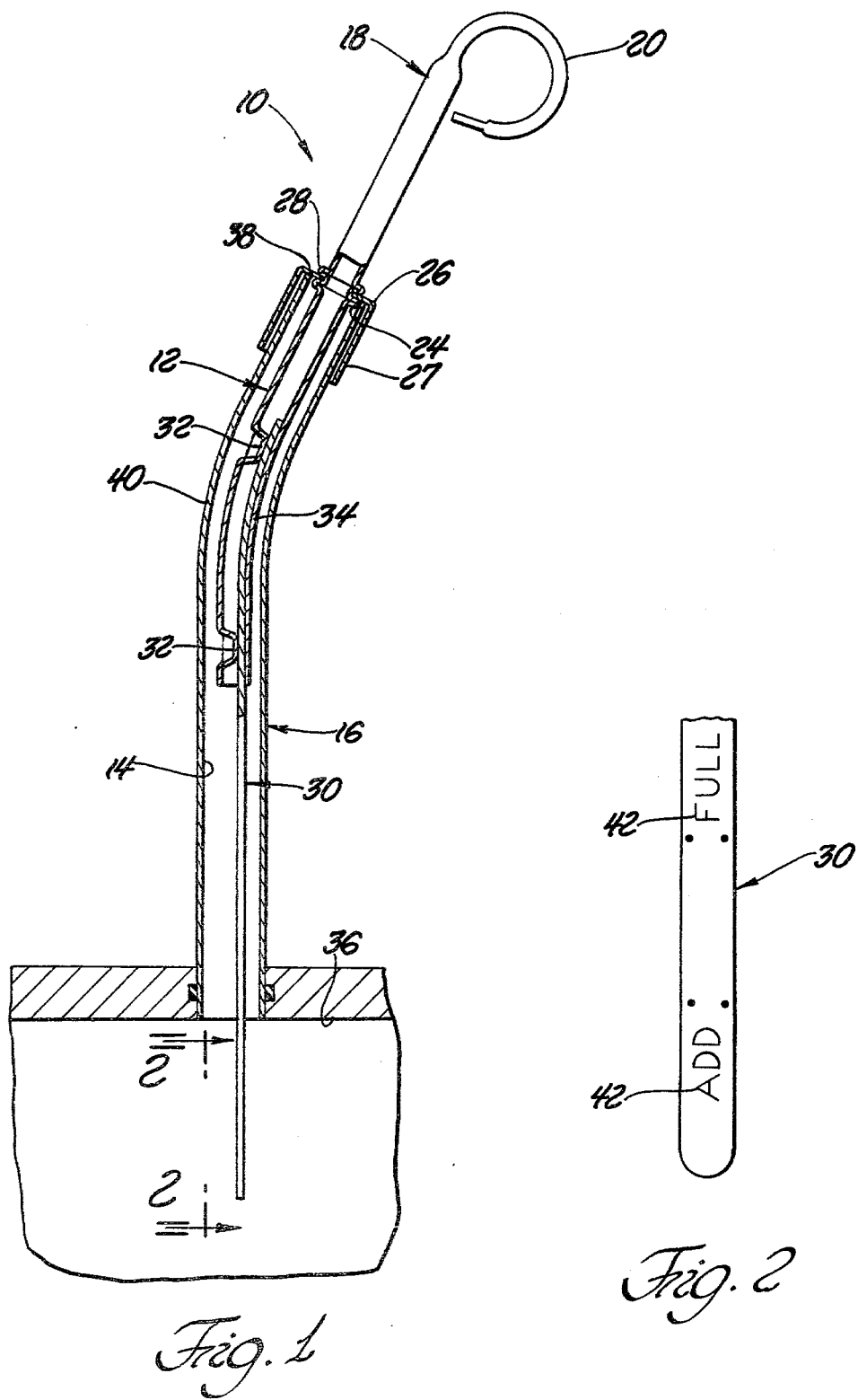

DIPSTICK ALIGNMENT GUIDE

BACKGROUND OF THE INVENTION

(1) Field of the Invention

This invention relates to a dipstick assembly of the type used for measuring the fluid level within a sealed chamber. The assembly usually includes an insertion means having a handle member and a fluid level indicating blade. The assembly would also include an access means for receiving the insertion instrument.

(2) Description of the Prior Art

Dipstick assemblies have been adapted to measure the fluid level in a variety of vessels. In a great many uses the insertion means of the dipstick assembly enters the vessel at an angle to the level of the contained fluid. Rotational movement of the insertion means within the access means of the vessel can result in drastic changes in the orientation of the fluid level indicating blade in relation to the fluid level. When this occurs, accurate measurement of the fluid level within the vessel is impossible.

SUMMARY OF THE INVENTION

The subject invention relates to a dipstick assembly for measuring the fluid level within a chamber and including an insertion means for indicating the fluid level within the chamber and having a rigid arcuate body portion and an access means for receiving the insertion means with the access means including a rigid arcuate portion of the same arcuate contour as the rigid arcuate body portion of the insertion means for preventing rotation of the insertion means when received in the access means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a broken away view partially in cross section showing internal details of the dipstick assembly; and FIG. 2 is a fragmentary plan view of the face of the measuring blade.

DESCRIPTION OF THE PREFERRED EMBODIMENT

Referring to FIG. 1, a dipstick assembly constructed in accordance with the instant invention is generally shown at 10.

The dipstick assembly includes an insertion means generally indicated at 12 for indicating the fluid level within a chamber 36. The insertion means 12 includes a rigid arcuate body portion 34. An access means 14 for receiving the insertion means 12 includes a rigid arcuate portion 40 of the same arcuate contour as the rigid arcuate body portion 34 of the insertion means 12 for preventing rotation of the insertion means 12 when it is received within the access passageway 14.

The insertion means 12 includes a handle member generally indicated at 18. The handle member comprises an arcuate end portion 20 and a straight portion 22. Attached to the arcuate body portion 34 is a flexible fluid level indicating blade generally indicated at 30.

In the preferred embodiment, the access means 14 is in the form of a tubular structure generally indicated at 16. However, it may be any such passageway of arcuate contour, such as a molded passageway within an engine block.

The assembly 10 may also include a capping means 26. The capping means 26 includes a skirt portion 27. The skirt portion 27 of the capping means 26 surrounds the exterior of the open end 38 of the access means 16 to stabilize the insertion means 12 within the access means 14. The inner surface of the capping means 26 abuts the open end 38 of the access means 14 for the purpose of limiting the insertion of the insertion means 12 into the access passageway 14. The surface above the capping means 26 abuts a first annular rib 28 which encircles the straight portion 22 of the handle member 18. The handle member 18 includes a second annular rib 24 below the capping means 26 resulting in a mechanical attachment for securing the capping means 26 to the handle member 18.

In the preferred embodiment, the fluid level indicating blade 30 is attached to the arcuate portion 34 of the insertion instrument 12 by stakes 32. Obviously, other means of attaching the fluid level indicating blade 30 to the insertion instrument 12 may be employed, if desired, without detracting from the concept of the instant invention. FIG. 2, taken along line 2-2 of FIG. 1, shows the face of the fluid level indicating blade 30 which would be exposed to the fluid within the chamber 36. Shown are markings 42 which would be stamped on the fluid level indicating blade 30. Any other markings to accomplish the desired purpose could be used which would not detract from the instant invention.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dipstick assembly of the type used for measuring the fluid level within a chamber, said dipstick assembly comprising: an insertion means for indicating the fluid level within a chamber, access means connected to said chamber, said insertion means including a rigid arcuate body portion and a flexible elongated fluid level indicating means connected to said insertion means and extending outwardly therefrom, said access means receiving said insertion means and said indicating means, said access means including a rigid arcuate portion of substantially the same arcuate contour as said rigid arcuate portion of said insertion means, said access means and said body portion of said insertion means cooperating to limit insertion of said insertion means and to prevent excessive relative rotation of said insertion means when received in said access means whereby said fluid level indicating means will be properly oriented so as to accurately indicate the level of the fluid within said chamber.

2. An assembly as set forth in claim 1 wherein said insertion means includes a handle member as a means for withdrawing said insertion means from said access means.

3. An assembly as set forth in claim 2 wherein said handle member is integrally formed with said arcuate body portion.

4. An assembly as set forth in claim 2 wherein said insertion means includes a fluid level indicating member attached to said handle member.

5. An assembly as set forth in claim 4 wherein said access means is a tubular member.

6. An assembly as set forth in claim 5 wherein said handle member includes a capping means for the stabilization of said insertion means within said access means, said capping means also limiting the insertion of said handle member into said access means.

7. An assembly as set forth in claim 6 wherein said handle member includes an arcuate end portion and a straight portion.

8. An assembly as set forth in claim 7 wherein said handle member includes a first annular rib encircling said straight portion of said handle member.

9. An assembly as set forth in claim 8 wherein the upper surface of said capping means abuts said annular rib, said handle member including a second annular rib below said capping means resulting in a mechanical attachment for securing said capping means to said handle member.

10. An assembly as set forth in claim 9 wherein said capping means includes a skirt portion having an inner diameter slightly greater than the outer diameter of said tubular member of said access means thereby establishing a close fitting engagement between said insertion means and access means.

11. An assembly as set forth in claim 10 wherein said fluid level indicating member is staked to said handle member.

12. An assembly as set forth in claim 11 wherein said fluid level indicating member includes markings for accurately indicating the fluid level within a chamber.

13. An assembly as set forth in claim 1 wherein said indicating means comprises an elongated blade member secured to said arcuate body portion.

* * * * *